(12) United States Patent
Träber

(10) Patent No.: US 7,616,714 B2
(45) Date of Patent: Nov. 10, 2009

(54) PROCESS AND DEVICE FOR THE PREDICTION OF NOISE CONTAINED IN A RECEIVED SIGNAL

(75) Inventor: Mario Träber, Deisenhofen (DE)

(73) Assignee: Infineon Technologies AG, Munich (DE)

(*) Notice: Subject to any disclaimer, the term of this patent is extended or adjusted under 35 U.S.C. 154(b) by 722 days.

(21) Appl. No.: 10/992,902

(22) Filed: Nov. 19, 2004

(65) Prior Publication Data
US 2005/0195925 A1  Sep. 8, 2005

(30) Foreign Application Priority Data
Nov. 21, 2003 (DE) ................. 103 54 557

(51) Int. Cl.
*H03D 1/00* (2006.01)
(52) U.S. Cl. .............. 375/343; 370/320; 370/335; 370/342; 370/441; 370/479; 370/515; 708/300
(58) Field of Classification Search ............... None
See application file for complete search history.

(56) References Cited

U.S. PATENT DOCUMENTS

| | | | |
|---|---|---|---|
| 3,939,461 A * | 2/1976 | Parvulescu ............ | 367/191 |
| 4,206,462 A * | 6/1980 | Rabow et al. .......... | 342/60 |
| 4,238,746 A * | 12/1980 | McCool et al. ......... | 333/166 |
| 4,403,184 A * | 9/1983 | Witt et al. ............. | 324/76.22 |
| 5,148,488 A * | 9/1992 | Chen et al. ............ | 704/219 |
| 5,249,204 A * | 9/1993 | Funderburk et al. .... | 375/344 |
| 5,386,495 A * | 1/1995 | Wong et al. ........... | 375/224 |
| 5,623,511 A * | 4/1997 | Bar-David et al. ...... | 375/143 |
| 5,742,694 A * | 4/1998 | Eatwell ............... | 381/94.2 |
| 5,903,819 A * | 5/1999 | Romesburg ........... | 455/63.1 |
| 6,260,010 B1 * | 7/2001 | Gao et al. ............. | 704/230 |
| 6,590,932 B1 | 7/2003 | Hui et al. | |

(Continued)

FOREIGN PATENT DOCUMENTS

DE  101 62 559 A 1  7/2003

(Continued)

OTHER PUBLICATIONS

John G. Proakis; Digital Communications Fourth Edition; pp. 638-941.

(Continued)

*Primary Examiner*—Shuwang Liu
*Assistant Examiner*—Gina McKie
(74) *Attorney, Agent, or Firm*—Brinks Hofer Gilson & Lione

(57) ABSTRACT

A device and method for predicting noise in a signal that is received by a digital receiver is provided. The device includes an autocorrelation function determination device and a noise predictor device. Also included in the device is an adaptive filter that produces a prediction error value for the received signal and the adaptive filter adjusts the filter coefficients as a function of a prediction error of the adaptive filter. Using the filter coefficient of the adaptive filter, the method may determine the autocorrelation function of the received signal. The noise estimated values for the noise contained in the received signal may be computed on a basis of the autocorrelation function of the received signal. The embodiment also may facilitate noise prediction when heavy correlated noise is present.

25 Claims, 2 Drawing Sheets

U.S. PATENT DOCUMENTS

| | | | | |
|---|---|---|---|---|
| 6,689,064 | B2 * | 2/2004 | Hager et al. | 600/454 |
| 6,690,739 | B1 * | 2/2004 | Mui | 375/265 |
| 7,082,204 | B2 * | 7/2006 | Gustavsson | 381/92 |
| 7,106,815 | B2 * | 9/2006 | Popper et al. | 375/346 |
| 7,522,367 | B2 * | 4/2009 | Eleftheriou et al. | 360/65 |
| 2004/0059988 | A1 * | 3/2004 | Murakami et al. | 714/776 |
| 2006/0029142 | A1 * | 2/2006 | Arad | 375/260 |
| 2007/0043559 | A1 * | 2/2007 | Fischer | 704/219 |

FOREIGN PATENT DOCUMENTS

WO    WO 03/047193 A1    6/2003

OTHER PUBLICATIONS

James R. Zeidler; Performance Analysis of LMS Adaptive Prediction Filters; Proceedings of the IEEE, vol. 78, No. 12, Dec. 1990; pp. 1781-1805.

New Automatic Equaliser Employing Modulo Arithmetic; Electronic Letters, vol. 7, Nos. 5/6, Mar. 25, 1971; pp. 138-139.

\* cited by examiner

PROCESS AND DEVICE FOR THE PREDICTION OF NOISE CONTAINED IN A RECEIVED SIGNAL

The present patent document claims priority under 35 U.S.C. §119(a)-(d) to German Application 103 54 557.3, filed in Germany on Nov. 21, 2003, which is hereby incorporated by reference.

BACKGROUND

1. Technical Field

The present invention relates to a process and device for predicting noise in a received signal, in particular, for predicting noise in received signals by digital receivers or transceiver modules in a wireless or wired digital transmission system.

2. Background Information

In modern digital receivers, the use of convolutional codes in conjunction with a Viterbi decoder has become the state of the art. A significant improvement in the signal-to-noise ratio (SNR) is obtained by coding. The Viterbi algorithm used for the decoding provides a trellis diagram, whereby the trellis diagram shows state changes over time based on the symbols received with the received signal. To decode the incoming symbols, path metrics are computed. During an evaluation of the path metrics, reliability information is obtained in the form of probabilities, whether a received symbol is based on a transmitted "0" or on a transmitted "1". The state transitions which are most probable with regard to their path metrics are selected in the trellis diagram. The reliability information is obtained by the added-up path metrics of the best "1-path" in relation to the added-up path metrics for the best "0-path." The paths, defining the most probable state transitions from one time-point to a following time-point, are also known as "survivor" paths. Since the Viterbi algorithm is the general state of the art, it will not be discussed further at this stage.

If a trellis-coded modulation environment ("TCM") is disturbed by heavily correlated noise ("HCN"), for example by pure sine waves with relatively large amplitudes, the system no longer functions. A convolution or a Viterbi decoder will determine the path metrics on the basis of "normal" white Gaussian noise (WGN). In reality, white noise is not the only noise that affects the signal. While minor noise influences may be tolerable, the Viterbi decoder and therefore the corresponding digital receiver de-converge if heavily correlated noise is present.

Heavy correlated noise arises when radio frequency interference ("RFI") is encountered. A known process to suppress the influence of heavy correlated noise is the use of linear noise predictors that forecast or estimate future noise influences and noise values on the basis of past noise influences and noise values. Linear noise prediction uses digital filters, whose coefficients, "taps", are adaptively adjusted dependent on the prediction of errors by the noise predictor. The aim is to optimize the coefficients of these digital filters so that the average square prediction error is minimized.

A simplified block diagram of a transmission system with a digital receiver, in which such decision-directed adaptive noise prediction is used, is reproduced in FIG. 1. In FIG. 1, it is assumed that a transmitted signal v is transmitted via a channel 2 from a signal source 1 of a transmitter resulting in a correspondingly distorted or disturbed signal c at the output of the channel 2. The input of the respective receiver is over-laid by correlated noise n, which in FIG. 1 is indicated in the form of a noise source 3 in combination with an adder 4. The received signal of the digital receiver is fed to an equalizer 5. The received signal u processed by the equalizer 5 is fed to a decider 6 that includes a slicer 7 in combination with a noise predictor 8. The slicer 7 makes symbol decisions based on the received signal after applying the Viterbi algorithm. The slicer 7 outputs a signal sequence v'. The signal sequence v' is combined in an adder 9 with a signal u' and the difference between the received signal u and the signal v' is fed back to the noise predictor 8 as an input signal. The noise predictor 8 calculates future noise values based on the signal from adder 9 for the noise previously contained in the received signal u. The current noise in the received signal u may be subtracted with the aid of adder 10 before the signal is fed to the slicer 7.

The noise predictor 8 and/or the corresponding digital linear prediction filter is optimized with regard to the filter coefficients such that the average square prediction error is minimized. This approach estimates the noise component contained in the received signal with the aid of a noise predictor and delivers good results as long as the correct prediction coefficients for the noise predictor are known. Since the noise signal is not known separately, but rather it additively overlays the actual wanted signal, the correct adjustment of the filter coefficients for the noise predictor must be adaptively matched to the noise. The technique is impaired because the noise predictor is embedded in a coded environment. The problem with this approach is the way the noise is synthesized, which corresponds to the problem of how correct decisions can be made in a coded environment.

Instead of a decision-oriented noise prediction approach described above, it was proposed to carry out a separate noise prediction for each survivor path of the trellis diagram on the basis of the linear prediction theory. The main disadvantage for the decision-oriented noise prediction is that the noise is not synthesized, but instead, the noise estimated values are incorporated in the branch and path metrics of the trellis diagram. The path metrics are corrected according to the noise estimated values before the survivor paths are determined. The states of a specific time-point in the trellis diagram, and not only the path metrics, have to be updated, but also the distances of the preceding branches pertaining to the respective survivor path and the number of the linear prediction filters at each time-point corresponding to the number of states in the trellis diagram need to be updated. Therefore a noise value must be predicted by linear filtering for each state in the trellis diagram.

If the branch metrics, associated with a specific state transition from a state s to a state s' at time-point t, are designated with $\lambda^{s,s'}(t)$, then for an optimal Viterbi decoder, which works in an environment with white Gaussian noise, the so-called Euclidean distance (ED) between the symbol u(t) received at the respective time-point and the estimated symbol $e^{s,s'}(t)$ assigned to the respective branches is:

$$\lambda^{s,s'}(t) = |u(t) - e^{s,s'}(t)|^2 = |\delta^{s,s'}(t)|^2 \tag{1}$$

The equation (1) corresponds to the noise estimated value $\delta^{s,s'}(t)$ assigned to the respective branch between the state s and the state s', which is laid over the received signal, if the state transition s to s' is correct. The noise estimated values of paths competing with one another at previous time-points are used to forecast the respective noise value for the time-point t. The state memory of the noise predictor for a trellis-state therefore corresponds to a vector of the noise estimated values. The trellis-noise predictor state memory functions as a time-dependent distance matrix which contains the noise estimated values $\delta^p(t)$ assigned to specific paths p by the trellis diagram:

$$\Delta(t) = \begin{bmatrix} \delta^0(t-1) & \delta^0(t-2) & \ldots & \delta^0(t-N) \\ \delta^1(t-1) & \delta^1(t-2) & \ldots & \delta^1(t-N) \\ \vdots & \vdots & \ddots & \vdots \\ \delta^{2^M-1}(t-1) & \delta^{2^M-1}(t-2) & \ldots & \delta^{2^M-1}(t-N) \end{bmatrix} \quad (2)$$

Here, N designates the number of time-points considered in total and M designates the overall memory of the Viterbi coder, so that the trellis diagram contains $2^M$ states and $2^M$ competing paths.

FIG. 2 shows an example of a trellis diagram with four states, the branch metrics $\lambda^{s,s'}(t)$ assigned to the individual branches and/or state transitions between two sequential states and the resulting path metrics $\gamma^s(t)$. The path metrics correspond to the branch metrics accumulated in each case, (s,s'=0, 1, 2, 3). The distance matrix for the trellis diagram illustrated reads as follows:

$$\Delta(t) = \begin{bmatrix} \delta^{0,0}(t-1) & \delta^{0,0}(t-2) \\ \delta^{0,1}(t-1) & \delta^{0,0}(t-2) \\ \delta^{3,2}(t-1) & \delta^{1,3}(t-2) \\ \delta^{3,3}(t-1) & \delta^{1,3}(t-2) \end{bmatrix} \quad (3)$$

The noise estimated values can be obtained in vector form as follows by matrix multiplication of the distance matrix $\Delta(t)$ and the noise predictor coefficient vector $\vec{w}_n$:

$$\vec{\xi}(t) = \Delta(t) \cdot \vec{w}_n = \begin{bmatrix} \xi^0(t) \\ \xi^1(t) \\ \vdots \\ \xi^{2^M-1}(t) \end{bmatrix} \quad (4)$$

The vector of the noise estimated values are updated for each time-point of the trellis diagram and contains the noise forecasts for all competing paths of the respective preceding time-point and/or the particular previous time instance. The noise prediction and/or noise estimated value determined for each path is used to compute the noise-estimated values for the paths leading away from the respective state at the current time-point.

In the example for the trellis diagram with four states, the noise estimated value $\xi^0(t)$ serves as a basis for all branches, which have their origin in the state s=0, that is the branches (s,s')=(0,0) and (s,s')=(0,1). The computation of the path metrics is altered as follows:

$$\gamma^{s'}(t)=\min\langle \gamma^s(t-1)+|\delta^{s,s'}(t)-\xi^s(t)|^2 \rangle \quad (5)$$

It is clear from the above equation (5) how the noise estimated values are determined according to equation (4) are incorporated into the computation of the corrected path metrics, where the pre-condition for the equation (5) is that the state transition from the state s to the state s' is a valid branch.

At each time-point for every trellis state, a decision must be made between two competing paths. For both branches a distance measurement $\delta^{s,s'}(t)$ is determined, from which a corresponding noise estimated value $\xi^s(t)$ is subtracted. In the example of FIG. 2, each noise estimated value for the two competing branches of a state is computed with the aid of a second order linear filter operation. With the aid of a linear filter with two taps, and the same tap weights are used for each case, only the state memory for computing the noise estimated values for each state will be altered. The state memory of the linear filter will then correspond exactly to a line of the distance matrix. The matrix multiplication is realized by sequential linear filtering. The distance matrix according to equation (3) is updated as a function of all path decisions, and the distance vector of the survivor path selected in each case is kept for further use, while the other distance vector is rejected. The distance vector that is kept will be updated by the distance measurement associated with the respective survivor path, while the oldest distance measurement in this distance vector is rejected. Since one assumes a state of at least two state transitions and/or branches, the noise estimated value $\xi^s(t)$ of a state is used at least twice. Therefore, it is advisable to employ the butterfly structure of the trellis diagram.

From equation (4) above, the noise estimated values, which serve to compute the noise-compensated path metrics of the respective trellis diagram, can be determined using the vector $\vec{w}_n$, which contains the coefficients of the noise predictor, so that this vector is designated as a noise predictor coefficient vector. A fundamental problem with this approach is the correct determination of the noise predictor coefficients incorporated in this vector for determining the noise estimated values for computing the corrected path metrics according to equations (4) and (5).

SUMMARY

This application provides a device and method for predicting noise in a received signal in a digital receiver. The device includes an autocorrelation function determination device that determines an autocorrelation function of a received signal. The device also includes a noise predictor device that determines noise estimated values for the noise contained in the received signal from the autocorrelation function of the received signal. An adaptive filter receives the signal and produces a prediction value for the received signal based on the parameters of the received signal. The adaptive filter adapts to the received signal and adjusts the filter coefficients as a function of a prediction error of the adaptive filter. The autocorrelation determination device may derive the autocorrelation function of the received signal from the filter coefficients of the adaptive filter when the adaptive filter is in a stable state.

In another embodiment, an autocorrelation filter may be included in the autocorrelation determination device for directly determining the autocorrelation function of the received signal from the received signal. A digital receiver will receive the signal for either a wireless or a wired digital transmission system.

In one embodiment, a method for predicting noise in a received signal includes providing the received signal to an adaptive filter. The adaptive filter produces a prediction value for the received signal on the basis of the received signal. The adaptive filter may adjust a filter coefficient depending upon a prediction error within the adaptive filter. Using the filter coefficient of the adaptive filter, the method will determine the autocorrelation function of the received signal. If the adaptive filter has reached a stable state, the autocorrelation function of the received signal may be determined from the filter coefficient of the adaptive filter. The noise estimated values for the noise contained in the received signal will be computed on a basis of the autocorrelation function of the received signal. The embodiment may also facilitate noise prediction when heavy correlated noise is present.

In one embodiment, the autocorrelation function of the received signal is obtained using a digital prediction filter. The prediction-values produced by the filter based on the received signal are subtracted from the received signal, dependent on the difference signal resulting therefrom and corresponding to the prediction error of this digital filter, to adjust the filter coefficients of the filter. In a stable state of this control loop the filter coefficients of the filter may contain the desired correlation information of the received signal. The stable state allows the autocorrelation function of the received signal to derive the filter coefficients, while making use of the Wiener-Hopf equation that may be solved with the aid of the "reversive" Levinson-Durbin algorithm. A prediction filter in this embodiment may be an adaptive line enhancer ("ALE") filter. Here, the determining step uses a value of a symbol received with the received signal using a trellis diagram correcting a metric of the trellis diagram as a function of the noise estimated values.

Further advantages of the invention can be derived from the following detailed description. Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE DRAWINGS
AND EMBODIMENTS

Figure 3:
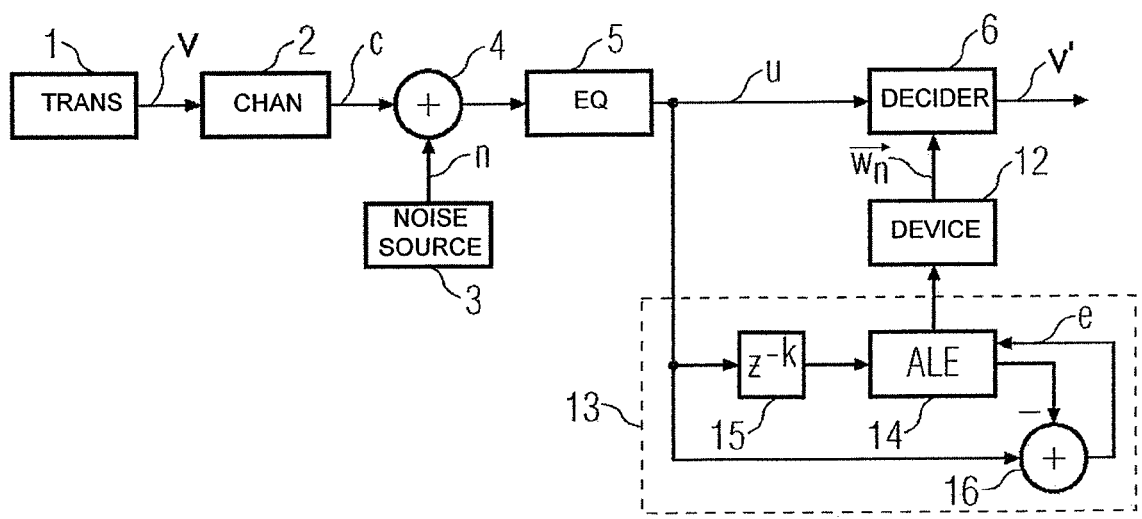
FIG. 3 is a block diagram of a digital receiver with an ALE filter for determining the autocorrelation function of a received signal.

A digital transmission system is illustrated in FIG. 3 showing a device in the receiver for determining the autocorrelation function of the received signal. The transmission system comprises a transmitter 1 that transmits a signal v through a wire or wireless channel 2 to a receiver. The signal c is transmitted through the channel 2 which may represent a wire or a wireless environment. In either environment the signal may be distorted and the noise n overlays the signal at the input of the receiver. The addition of the noise is indicated schematically in FIG. 3 in the form of a noise source 3 and an adder 4. The received signal containing noise may be directed to a signal equalizer 5. The purpose for the signal equalizer is the removal of intersymbol interference. The received signal u, which still contains a noise component, is fed to a decider 6, where a Viterbi decoder is integrated. A Viterbi decoder is a maximum likelihood decoding procedure for convolutional codes. The decider 6 evaluates the equalized signal u in order to make as correct a decision as possible for each received symbol and determines whether the symbol is based on a transmitted "0" or a transmitted "1". In an ideal case, the decider 6 outputs the correctly decoded transmitted signal v'.

Figure 1:
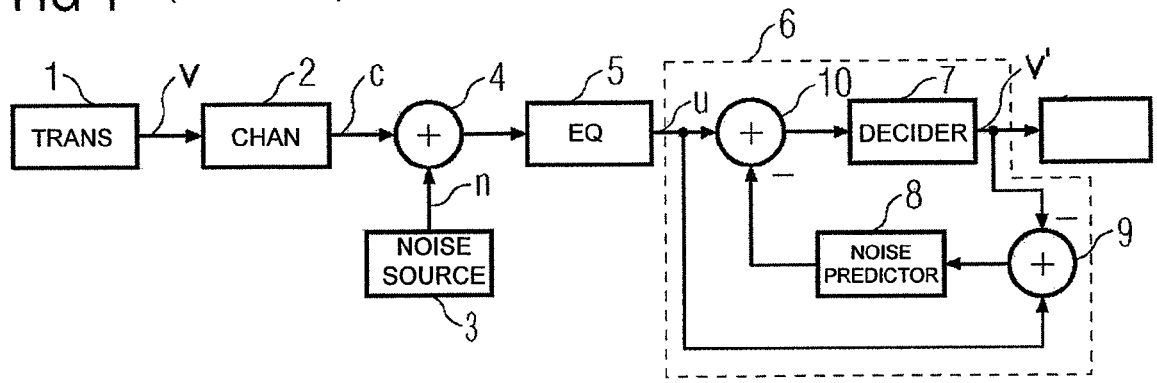
FIG. 1 is a block diagram of a prior art digital receiver with decision-oriented adaptive noise prediction.
Figure 2:
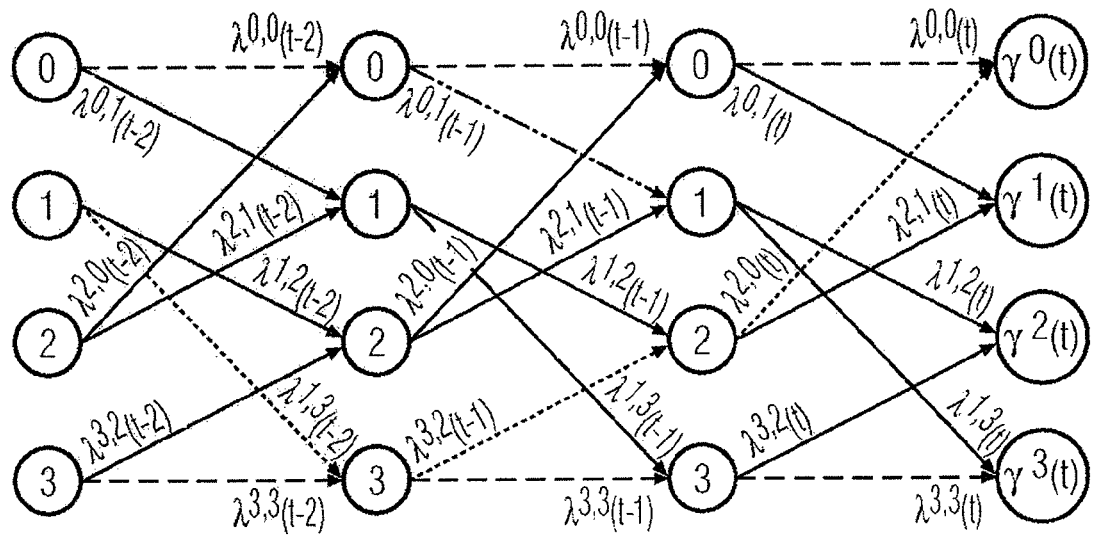
FIG. 2 is a prior art trellis diagram explaining the determination of path metrics using noise-estimated values.

The decider 6 makes decisions on the basis of FIG. 2. The decider 6 applies the Viterbi algorithm, evaluating the path and/or branch metrics in connection with the respective trellis diagram and corrected in agreement with the above equations (4) and (5) by noise estimated values. The decider 6, as evident from equation (4), uses the vector $\vec{w}_n$ that includes the coefficients for facilitating noise prediction. The coefficients are designated as noise predictor coefficients.

In the embodiment of FIG. 3, a device 12 is provided that determines the autocorrelation function of the received signal u deriving the noise predictor coefficients. The noise predictor coefficients are fed to the decider 6, updating the path and/or branch metrics in agreement with the equations (4) and (5). The most correct decision between "1" and "0" symbols, despite the presence of possibly heavily correlated noise, is made on the basis of these noise predictor coefficients and the corresponding noise prediction vector.

The equalized received signal u is fed to the decider 6 and to a filter arrangement 13. The filter arrangement may be designated as an adaptive "line enhancer" (ALE) filter arrangement. This filter arrangement 13 includes a digital ALE filter 14 that further includes a prediction error filter. The principles of ALE filters are explained in James R. Zeidler, "Performance Analysis of LMS Adaptive Prediction Filters", Proceedings of IEEE, vol. 28, no. 12, December 1990, which is hereby incorporated by reference.

As illustrated in FIG. 3, the received signal u is fed via a delay element 15 to the ALE filter 14. Additionally, the received signal u is fed to an adder 16, which subtracts the output signal produced by the ALE filter 14. The ALE filter 14 produces prediction values based on the input signal to the ALE filter arrangement 13. The prediction values are an output signal, where the tap weights $\vec{w}_e$, of the ALE filter arrangement 13 depend on the tap weights $\vec{w}_f$ of the digital ALE filter 14 arranged in the forward path in the following relationship:

$$\vec{w}_e = \begin{bmatrix} 1 \\ -\vec{w}_f \end{bmatrix} \tag{6}$$

Equation (6) indicates that the prediction values produced by the ALE filter 14, which are based on the input signal to the ALE filter arrangement 13, are subtracted from the input signal itself, so that the output signal of the adder 16 corresponds to the prediction error. The prediction error power $P_M$ of the ALE filter arrangement 13 of M order may be expressed as follows:

$$\begin{bmatrix} P_M \\ \vec{0} \end{bmatrix} = \begin{bmatrix} r(o) & \vec{r}^T \\ \vec{r} & R \end{bmatrix} \begin{bmatrix} 1 \\ -\vec{w}_f \end{bmatrix} \tag{7}$$

where $\vec{r}$ designates the autocorrelation vector as follows:

$$\vec{r} = \begin{bmatrix} r(1) \\ r(2) \\ \vdots \\ r(M) \end{bmatrix} \quad (8)$$

R designates the autocorrelation matrix, which has a Toeplitz structure:

$$R = \begin{bmatrix} r(0) & r(1) & \ldots & r(M-1) \\ r(1) & r(0) & \ldots & r(M-2) \\ \vdots & \vdots & \ddots & \vdots \\ r(M-1) & r(M-2) & \ldots & r(0) \end{bmatrix} \quad (9)$$

and $\vec{w}_f$ is the vector with the linear prediction coefficients and/or prediction tap weights of the ALE filter 14 and is expressed as follows:

$$\vec{w}_f = \begin{bmatrix} w_1 \\ w_2 \\ \vdots \\ w_M \end{bmatrix} \quad (10)$$

The coefficients of the ALE filter 14 are continually updated dependent upon the prediction error e using the LMS algorithm, so that the prediction error e is minimized. As described in the publication mentioned above, the prediction error signal e in the stable state, if the description error e is minimized, does not correlate with the prediction performance $P_M$. The coefficients of the ALE filter 14 in the stable state may contain the entire correlation information of the input signal. That is to say according to FIG. 3 of the equalized received signal u, the autocorrelation function of the received signal u can be derived in the stable state of the ALE filter arrangement 13 from the coefficients of the ALE filter 14.

In a known way, the optimum prediction coefficients and/or prediction tap weights of the ALE filter 14 can be determined by solving the Wiener-Hopf equation as follows from the autocorrelation matrix R and the autocorrelation vector $\vec{r}$, where $$R\vec{w}_0 = \vec{r} \quad (11)$$

and $\vec{w}_0$ designates the vector with the optimum prediction coefficients and/or tap weights of the ALE filter 14. Since the autocorrelation matrix and the autocorrelation vector both contain one and the same information, the exact autocorrelation function of the input signal can be computed from the vector $\vec{w}_0$, whereby the following matrix equation is solved:

$$\begin{bmatrix} r(0) & r(1) & \ldots & r(M-1) \\ r(1) & r(0) & \ldots & r(M-2) \\ \vdots & \vdots & \ddots & \vdots \\ r(M-1) & r(M-2) & \ldots & r(0) \end{bmatrix} \begin{bmatrix} w_1 \\ w_2 \\ \vdots \\ w_M \end{bmatrix} - \begin{bmatrix} r(1) \\ r(2) \\ \vdots \\ r(M) \end{bmatrix} = 0 \quad (12)$$

Here, the mechanics for solving the equation (12) will not be discussed. The solution corresponds to the autocorrelation function of the received signal u. However, the equation may be solved preferably with the aid of the known reversive Levinson-Durbin reversion.

The device 12 in FIG. 3 not only determines the autocorrelation function of the received signal u from the coefficients of the ALE filter 14; the device 12 also extracts from the autocorrelation function of the received signal, the autocorrelation information of the noise signal n contained in the received signal to determine the noise predictor coefficients and transmit the coefficients to the decider 6. The decider 6, based on these noise predictor coefficients, may decide the noise estimated values for updating the path and branch metrics. The noise predictor coefficients are adaptively kept or adjusted.

The autocorrelation function $r_u(\tau)$ of the received signal is the sum of the autocorrelation functions of the noise signal $r_n(\tau)$ and the transmission signal $r_v(\tau)$. To determine the autocorrelation function $r_n(\tau)$ of the noise component, the autocorrelation function $r_v(\tau)$ of the transmission signal is subtracted from the known autocorrelation function $r_u(\tau)$ of the received signal. The autocorrelation function $r_v(\tau)$ is known during this step.

In some applications, communication systems include scrambling blocks that de-correlate the respective data. The scrambling blocks may be necessary for the decoder algorithm. This means that no data correlation may exist between sequential data symbols and for the autocorrelation function of the transmission signal v the following expression will apply:

$$r_v(\tau) = \begin{cases} P_v = \lim_{n \to \infty} \frac{1}{N} \sum_{n=0}^{N-1} |v(t)|^2 & \tau = 0 \\ 0 & \tau \neq 0 \end{cases} \quad (13)$$

where $P_v$ designates the transmitting power of the transmitted signal v. In other words, this means that only the received signal power of the wanted signal may be subtracted from the lag 0 of the autocorrelation function $r_u(\tau)$ of the received signal to obtain the desired autocorrelation function $r_n(\tau)$ of the noise component as follows:

$$r_n(\tau) = \begin{cases} r_u(0) - P_v = P_u - P_v & \tau = 0 \\ r_u(\tau) & \tau \neq 0 \end{cases} \quad (14)$$

Equation (14) $P_U$ designates the power of the received signal u as defined by $P_u = r_u(0)$. It may be possible to measure the received signal power of the wanted signal $P_v$. However, since usually a-priori knowledge of the received signal power of the wanted signal $P_v$ is present, the measurement may not be necessary. In an example where the transmitted signal v involves a signal modulated according to M order pulse amplitude modulation, the received signal power of the wanted signal is defined as follows:

$$P_v = \frac{1}{3} \frac{M^2 - 1}{M^2} \qquad (15)$$

A constant value will be subtracted from $r_u(0)$, in order to obtain the autocorrelation function $r_n(\tau)$ of the noise component. It may be possible to determine the incoming power of the wanted signal irrespective of the method of modulation used in each case. As soon as the autocorrelation function $r_n(\tau)$ of the noise component is known, the vector with the optimum noise predictor coefficients for the decider 6 can be determined by applying the Levinson-Durbin algorithm with the aid of the Wiener-Hopf equation:

$$R_n \vec{w}_n = \vec{r}_n \qquad (16)$$

$R_n$ designates the corresponding autocorrelation matrix, and $\vec{w}_n$ the noise predictor coefficient vector, which contains the noise predictor coefficients for the decider 6. The decider 6, on the basis of these noise predictor coefficients and in agreement with equation (4), may determine noise estimated values for correcting the path metrics with equation (5). For the sake of completeness, it is pointed out that the Wiener-Hopf equation (15) in principle can be solved by all algorithms known from the theory of linear equation. Due to the Toeplitz structure of the autocorrelation matrix, however the iterative Levinson-Durbin recursion is recommended. The iterative Levinson-Durbin recursion is the preferred method with regard to its simplicity of the Cholesky factorization.

Figure 4:
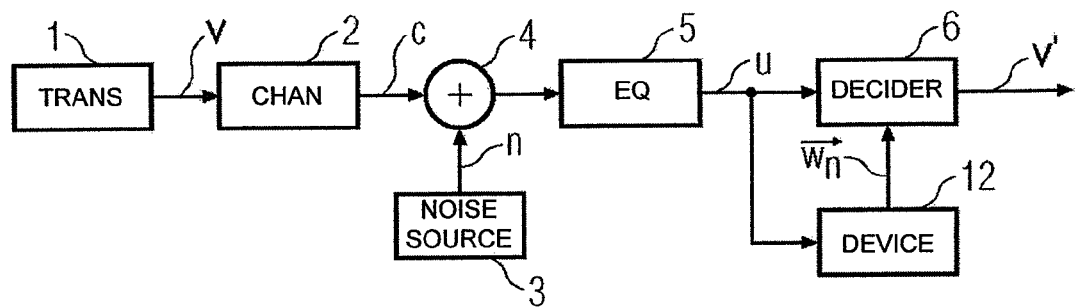
FIG. 4 is a block diagram of a digital receiver with a digital autocorrelation filter for directly determining the autocorrelation function of a received signal from the received signal.

FIG. 4 shows another embodiment for determining the autocorrelation function of the received signal u. The device 12 in FIG. 4 includes a filter, that is designated as an autocorrelation filter and the autocorrelation function is directly computed from the received signal u fed to device 12. An advantage of this approach improves the quality for determining the autocorrelation function $r_u(\tau)$, reducing the cost in comparison to the embodiment of FIG. 3.

In the embodiment of FIG. 4, the device 12 differs from the device 12 shown in FIG. 3 only in the way this autocorrelation function of the received signal is determined. The autocorrelation function $r_n(\tau)$ of the noise signal as well as the noise predictor coefficient vector $\vec{w}_n$ may be determined in similar fashion to FIG. 3. The algorithms described above deliver perfect results if the data signal is not correlated. However, applications and operating states are conceivable in which this pre-condition is not fulfilled.

In an example of an unfulfilled precondition is the use of Tomlinson Harashima pre-coding, as described in M. Tomlinson, "New Automatic Equalizer Employing Modulo Arithmetic", Electronics Letters, vol. 7, no. 576, pp. 138-139, March 1971 which is hereby incorporated by reference. The Tomlinson Harishima method introduces a transmission method representing a special case where the wanted signal is uncorrelated after a non-linear operation and transforms the decision-back-coupled equalizer filter into the transmitter. As a result pre-equalisation of the transmitted signal is obtained by the transmission channel 2. The impulse response (after the decider tap) of the channel in this case corresponds to the impulse response of the pre-equaliser filter. In order to keep the pre-equaliser stable, non-linear operation (the modulo) is used. Therefore the output of the pre-equaliser is uncorrelated and has uniform distribution. If this signal is now subjected to convolution with the channel impulse response, naturally correlation of the received wanted signal results based on the channel impulse coefficients.

This is irrelevant for the actual subsequent processing of the received wanted signal, since an inverse non-linear operation (again the modulo) is applied beforehand. The noise correlation can no longer be measured directly in the signal after this modulo operation. Therefore the process according to the invention can only be applied to the signal before this modulo operation. Here, however, the wanted signal itself is correlated and therefore the reworking must be matched to the autocorrelation function of the received signal in order to determine the autocorrelation function of the noise signal. For this purpose there are two options.

The first option consists of subtracting the entire autocorrelation function of the received wanted signal from the autocorrelation function of the received signal. This is possible, since the auto correlation function of the wanted signal can be determined a-priori by the coefficients in the pre-equaliser, e.g. by self-convolution. This process functions without limitation so long as the difference in the amount between the autocorrelation function of the noise signal and the autocorrelation of the received wanted signal is not too great.

Since this pre-coding of the data signal is heavily correlated, the correlation heavily overlays the autocorrelation function. Then a second option may be particularly suitable, especially if one or more narrow-band sources of radio noise (in the special case sine sources of radio noise) are present as heavily correlated noise. In order to take into consideration such heavy correlation, only the autocorrelation function of the received signal can be evaluated in a lag section. The autocorrelation of the received signal contains substantially the entire noise information of the respective noise signal. The noise information comprises both amplitude information as well as frequency information of the noise signal. This is possible since in particular sine sources of radio noise exhibit an autocorrelation function, which with a specific amplitude corresponds to a cosine of the same frequency—thus is periodic and does not fade away. Since the autocorrelation function of the received signal with low lag values is relatively heavily overlaid by the correlation of the received data signal, and is reduced with increasing lags, it is advisable only to evaluate the autocorrelation function of the received signal for the lags $\tau$ greater than a specific limit value. The noise signal correlation information may be separated from the wanted signal received by this process. If however the autocorrelation function of the narrow-band source of radio noise (e.g. sine sources of radio noise) is scanned with higher lags, a phase offset for the periodic autocorrelation function is obtained.

The correlation information may be entirely contained in the coefficients of the Tomlinson Harashima pre-coder and therefore known to the receiver. In principle, it may be possible to compute the autocorrelation function of the data signal and subtract this from each lag of the determined and/or estimated autocorrelation function. However, in practice, due to the complexity and the proneness to faults associated therewith, further improvements are necessary. To obtain the correct information about the autocorrelation function of the received signal and/or the noise signal contained therein as a basis for determining the noise predictor coefficients, the possibility also exists with a received signal dominated by the data signal correlation to obtain correct information about the autocorrelation function of the received signal and/or the noise signal contained therein.

By way of example, it is known that the autocorrelation function of a pure sine wave x(t), which is regarded as a narrow band source of radio noise and is defined as follows:

$$x(t) = a \cdot \sin(\omega t + \phi) \rightarrow r_x(\tau) = \frac{a^2}{2}\cos(\omega\tau) \quad (17)$$

where $r_x(\tau)$ designates the autocorrelation function of the sine wave x(t), and a designates the amplitude as well as θ the phase of the sine wave x(t). It is clear from (17) that the autocorrelation function of a sine/cosine wave is again a cosine wave with the amplitude $a^2/2$, where the autocorrelation function has the same frequency as the base signal, but no phase offset.

In order to take this phase offset into consideration, the evaluated section of the autocorrelation function of the received signal can advantageously again be subjected to an autocorrelation function operation, which corresponds to a convolution of the evaluated section of the autocorrelation function of the received signal. After subsequent scaling of the autocorrelation function resulting therefrom, the values of the autocorrelation function can be used for determining the noise predictor coefficients.

Figure 5:
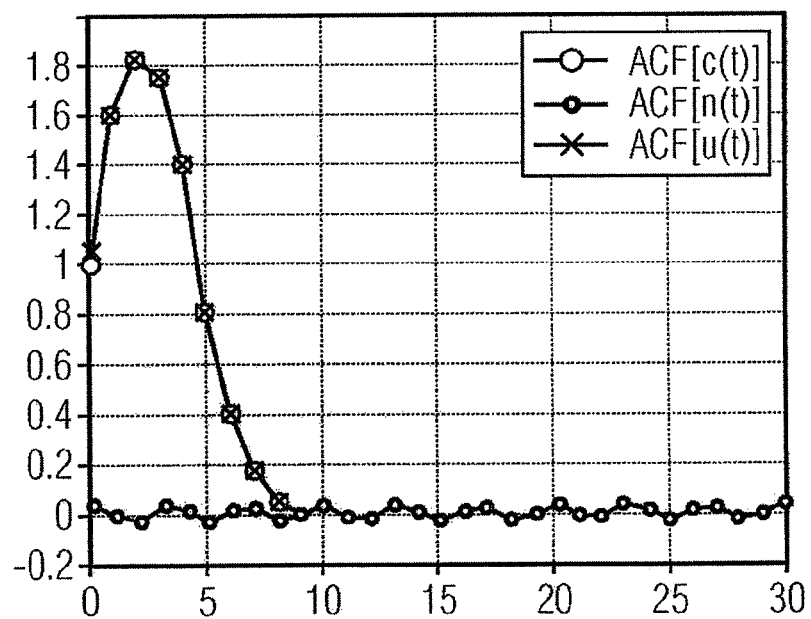
FIG. 5 is an illustration of autocorrelation functions of a received signal for determining noise predictor coefficients.

This will be explained in detail with reference to FIG. 5. FIG. 5 is an example of the sequence of the autocorrelation function of the received signal c(t) that is not overlaid with noise. This received signal c(t) is shown by the white circles. In FIG. 5, the autocorrelation function of the noise signal n(t) is illustrated with black circles and the autocorrelation function of the received signal u(t) is illustrated with crosses. The autocorrelation function is not phase-dependent and contains the correlation information based on the periodic characteristics of the autocorrelation function also in sections of any arbitrarily large lags. It may be possible to derive the pertinent information for determining the noise predictor coefficients from lags in the autocorrelation function of the received signal, which are not impaired by the relatively heavy data signal correlation.

From FIG. 5, it is particularly clear that the noise information in the autocorrelation function of the received signal contained in the autocorrelation function of the noise signal n(t) is substantially overlaid by the correlation of the data or wanted signal in the low lag section. For example, in the section $0 \leq \tau \leq 10$, the autocorrelation function of the received signal is substantially dominated by the data and/or wanted signal correlation. Furthermore, it is also clear from FIG. 5 that for lags of $\tau \leq 10$, the influence of the data signal correlation virtually disappears, since the sequence of the autocorrelation function of the received signal c(t) substantially corresponds to the sequence of the autocorrelation function of the noise signal n(t). If the lags of the autocorrelation function of the received signal c(t) evaluated for determining the noise predictor coefficients are selected to be sufficiently large, these contain the entire amplitude and frequency information of the noise signal. In order to determine the noise predictor coefficients, a section of the autocorrelation function of the received signal, which is no longer dominated and/or affected by the data signal correlation, may be evaluated. This applies for example in the case of the sequence of the autocorrelation function shown in FIG. 5 for the section of the autocorrelation function of the received signal between lags 15 and 25.

The only problem to be solved is that by definition the auto correlation function of a sine wave is a cosine wave with phase 0 in the case of lag 0, for example where $\tau=0$ (see equation 17). When evaluating a section of the autocorrelation function of the received signal, which does not begin with $\tau=0$, the phase offset resulting from the autocorrelation function of the received signal is taken into consideration.

One embodiment for resolving the phase problem considers a section of the autocorrelation function of the received signal, for example between lags 15 and 25. The autocorrelation function is evaluated in each case as a separate signal and re-computes the autocorrelation function from this section of the autocorrelation function. The result is a cosine wave with the same frequency and an amplitude of $b^2/2$. However, the recomputed autocorrelation function $r'_x(\tau)$ no longer contains phase information. That is, the phase offset equals 0, which corresponds to the desired result, since the autocorrelation function of the noise signal may be derived therefrom as described. Only the autocorrelation function $r'_x(\tau)$ of the autocorrelation function $r_x(\tau)$ is scaled with a suitable factor F for correcting the amplitude. The scaling factor can therefore be determined as follows:

$$r_x(\tau) = \frac{a^2}{2}\cos(\omega\tau) \rightarrow r'_x(\tau) = \frac{b^2}{2}\cos(\omega\tau) \quad (18)$$

$$F\frac{b^2}{2} \stackrel{!}{=} \frac{a^2}{2} \rightarrow F = \frac{a^2}{b^2} = \frac{a^2}{2r'_x(0)}$$

$$b = \frac{a^2}{2} \Rightarrow a = \sqrt{2b} = \sqrt{2\sqrt{2r'_x(0)}}$$

$$F = \frac{\left(\sqrt{2\sqrt{2r'_x(0)}}\right)^2}{2r'_x(0)} = 2\frac{\sqrt{2r'_x(0)}}{2r'_x(0)}$$

$$= \frac{2}{\sqrt{2r'_x(0)}} = \sqrt{\frac{2}{r'_x(0)}}$$

If the circumstances described above are transposed to the present case of the autocorrelation function $r_u(\tau)$ of the received signal u(t), this means that only an interesting section of this autocorrelation function must be selected for further evaluation. Subsequently the autocorrelation function $r_u(\tau)$ is again determined as described from this interesting section of the autocorrelation function $r_u(\tau)$ and then multiplied in agreement with equation (18) by the scaling factor F for correcting the amplitude. In this case, the autocorrelation function of the interesting section of the autocorrelation function $r_u(\tau)$ can be determined by convolution of the interesting section by $r_u(\tau)$. Finally as described above, the autocorrelation function $r_n(\tau)$ of the noise signal can be determined from the autocorrelation function $r'_u(\tau)$, in order again on the basis of the same to calculate the noise predictor coefficients and/or the corresponding noise predictor coefficient vector $\vec{w}_n$ for the decider 6.

An embodiment of the invention is suitable for reliable noise prediction even in the presence of heavily correlated noise for example in xDSL receivers, without however being restricted to the preferred scope of application. Rather the invention can be used in all digital receivers of wire-bound or wireless transmission systems, whereby using noise predictor coefficients noise estimated values are determined for a decider, so that the decider can make a correct decision based on these noise estimated values concerning the symbols received in each case.

The process according to the invention is based on the autocorrelation function of the received signal, which can be converted by suitable reworking into the autocorrelation function of the noise signal. This is then used by solving the Wiener-Hopf equation, preferably with the known Levinson-Durbin algorithm, to determine the predictor filter coefficients. The autocorrelation function of the received signal in this case can be determined indirectly, as illustrated according to the invention, by adapting an ALE filter and subsequent computation of the autocorrelation function, preferably with the known (inverse) Levinson-Durbin algorithm, by directly determining the autocorrelation function of the received signal with a correlator.

It is therefore intended that the foregoing detailed description be regarded as illustrative rather than limiting, and that it be understood that it is the following claims, including all equivalents, that are intended to define the spirit and scope of this invention.

The invention claimed is:

1. A device for predicting noise in a received signal, comprising:
   an autocorrelation function determination device that determines an autocorrelation function of the received signal;
   a noise predictor device that determines noise estimated values for the noise contained in the received signal from the autocorrelation function of the received signal by computing the noise estimated values from an autocorrelation function of the noise contained in the received signal, the autocorrelation function of the noise being determined by subtracting an autocorrelation function of a received wanted signal from the autocorrelation function of the received signal, the autocorrelation function of the received wanted signal being derived from received signal power of the received wanted signal; and
   an adaptive filter receiving the received signal and producing a prediction value for the received signal based on the received signal, wherein the adaptive filter has filter coefficients and adaptively adjusts the filter coefficients as a function of a prediction error of the adaptive filter, and the autocorrelation determination device derives the autocorrelation function of the received signal from the filter coefficients of the adaptive filter when the adaptive filter is in a stable state,
   wherein the autocorrelation function of the received wanted signal is determined as follows:

$$r_v(\tau) = \begin{cases} P_V & \tau = 0 \\ 0 & \tau \neq 0 \end{cases},$$

where $r_v(\tau)$ designates the autocorrelation function of the received wanted signal and $P_V$, a received signal power of the received wanted signal, and
   wherein the received signal is a pulse amplitude-modulated signal and to determine the autocorrelation function of the received wanted signal, the received signal power $P_V$ of the received wanted signal is determined dependent on a number of stages of the pulse amplitude modulation as follows:

$$P_v = \frac{1}{3} \frac{M^2 - 1}{M^2},$$

where M designates the number of stages of the pulse amplitude modulation.

2. The device of claim 1, where the autocorrelation function determination device further comprises an autocorrelation filter for directly determining the autocorrelation function of the received signal from the received signal.

3. The device of claim 1, further comprising a digital receiver for receiving the received signal transmitted via a transmission channel.

4. A method for predicting noise in a received signal, comprising the following steps:
   (a) providing the received signal to an adaptive filter;
   (b) producing a prediction value for the received signal with the adaptive filter on a basis of the received signal;
   (c) adjusting a filter coefficient of the adaptive filter dependent upon a prediction error of the adaptive filter;
   (d) determining an autocorrelation function of the received signal based on the adjusted filter coefficient of the adaptive filter; and
   (e) computing noise estimated values for the noise contained in the received signal on a basis of the autocorrelation function of the received signal, wherein the autocorrelation function of the received signal is determined from the adjusted filter coefficient of the adaptive filter, where the adaptive filter has reached a stable state, including computing the noise estimated values from an autocorrelation function of the noise contained in the received signal, wherein the autocorrelation of the noise is determined from the autocorrelation function of the received signal, the autocorrelation function of the noise being determined by subtracting an autocorrelation function of a received wanted signal, on which the received signal is based, from the autocorrelation function of the received signal, wherein the autocorrelation function of the received wanted signal is derived from the received signal power of the received wanted signal,
   wherein the autocorrelation function of the received wanted signal is determined as follows:

$$r_v(\tau) = \begin{cases} P_V & \tau = 0 \\ 0 & \tau \neq 0 \end{cases},$$

where $r_v(\tau)$ designates the autocorrelation function of the received wanted signal and $P_V$, a received signal power of the received wanted signal, and
   wherein the received signal is a pulse amplitude-modulated signal and to determine the autocorrelation function of the received wanted signal the received signal power $P_V$ of the received wanted signal is determined dependent on a number of stages of the pulse amplitude modulation as follows:

$$P_v = \frac{1}{3} \frac{M^2 - 1}{M^2},$$

where M designates the number of stages of the pulse amplitude modulation.

5. The method of claim 4, wherein the determining step uses a value of a symbol received with the received signal using a trellis diagram.

6. The method of claim 5, further comprising the step of correcting a metric of the trellis diagram as a function of the noise estimated values.

7. The method of claim 4, further comprising the step of equalizing the received signal before determining the autocorrelation function of the received signal.

8. The method of claim 4, further comprising the step of adjusting the filter coefficients of the adaptive filter as a function of the prediction error using an LMS algorithm.

9. The method of claim 4, wherein the adaptive filter is an adaptive line enhancer filter.

10. The method of claim 4, wherein the autocorrelation function of the received signal is determined from the filter coefficients of the adaptive filter according to the equation:

$$R\vec{w}_0 = \vec{r},$$

where $\vec{w}_0$ designates a vector with the filter coefficients of the adaptive filter in the stable state of the filter, $\vec{r}$ a autocorrelation vector of the received signal and R an autocorrelation matrix of the received signal on the basis of the autocorrelation vector.

11. The method of claim 10, wherein the autocorrelation function of the received signal is obtained from the equation using a reversive Levinson-Durbin algorithm.

12. The method of claim 4, further comprising the step of determining directly from the received signal the autocorrelation function of the received signal using an autocorrelation filter.

13. The method of claim 4, wherein the received signal is modulated and to determine the autocorrelation function of the received wanted signal, the received signal power of the received wanted signal is determined dependent on the method of modulation.

14. The method of claim 4, wherein the autocorrelation function of the noise is determined from the following:

$$r_n(\tau) = \begin{cases} r_u(0) - P_v & \tau = 0 \\ r_u(\tau) & \tau \neq 0 \end{cases},$$

where $r_n(\tau)$ is the autocorrelation function of the noise, $r_u(\tau)$ is the autocorrelation function of the received signal and $P_v$ a received signal power of the received wanted signal.

15. The method of claim 4, further comprising the step of obtaining noise predictor coefficients for a noise predictor from an autocorrelation function of the noise for determining the noise-estimated values via the following equation:

$$R_n \vec{w}_n = \vec{r}_n,$$

where $\vec{r}_n$ designates the autocorrelation vector of the noise, $R_n$ an autocorrelation matrix of the noise on the basis of the autocorrelation vector and $\vec{w}_n$ a vector with the noise predictor coefficients.

16. The method of claim 15, further comprising the step of determining the noise predictor coefficients via the equation using the reversive Levinson-Durbin algorithm.

17. The method of claim 15, further comprising the step of adaptively adjusting the noise predictor coefficients after the coefficients have been determined.

18. A method for predicting noise in a received signal, comprising the following steps:
(a) providing the received signal to an adaptive filter;
(b) producing a prediction value for the received signal with the adaptive filter on a basis of the received signal;
(c) adjusting a filter coefficient of the adaptive filter dependent upon a prediction error of the adaptive filter;
(d) determining an autocorrelation function of the received signal based on the adjusted filter coefficient of the adaptive filter, where the adaptive filter has reached a stable state;
(e) processing the autocorrelation function of the received signal for considering a correlation of the received signal by a wanted signal contained in the received signal; and
(f) determining noise estimated values for the noise contained in the received signal from the processed autocorrelation function of the received signal, including determining the noise estimated values with the autocorrelation function of the received signal wherein only a section of the autocorrelation function of the received signal is evaluated, the received signal substantially containing the entirety of information about the noise,
wherein prior to determining the noise estimated values from the evaluated section of the autocorrelation function of the received signal, the autocorrelation function of the evaluated section of the autocorrelation function of the received signal is again constituted to determine the noise estimated values on the basis of this re-constituted autocorrelation function.

19. The method of claim 18, wherein the autocorrelation function of the received signal is processed by using a Tomlinson Harashima pre-coding to which a transmitted signal based on the received signal is subjected.

20. The method of claim 18, wherein the section of the autocorrelation function of the received signal to be evaluated is selected so that the section substantially contains the entire amplitude information and frequency information about the noise.

21. The method of claim 18, wherein the section of the autocorrelation function $r_u(\tau)$ of the received signal to be evaluated corresponds to a section of the autocorrelation function of the received signal where $\tau$ is greater than or equal to a specific limit value.

22. The method of claim 18, wherein when only the section of the autocorrelation function of the received signal is evaluated, a phase offset in the autocorrelation function of the received signal is corrected.

23. The method of claim 18, wherein the autocorrelation function of the evaluated section of the autocorrelation function of the received signal comprises a convolution of the evaluated section of the autocorrelation function of the received signal.

24. The method of claim 18, wherein prior to determining the noise estimated values, the autocorrelation function of the evaluated section of the autocorrelation function of the received signal is scaled with a scaling factor.

25. A device for predicting noise in a received signal, comprising:
an autocorrelation function determination device that determines an autocorrelation function of the received signal;
a noise predictor device that processes the autocorrelation function of the received signal for considering a correlation of the received signal by a wanted signal contained in the received signal and determines noise estimated values for the noise contained in the received signal from the processed autocorrelation function of the received signal, the noise predictor device configured to determine the noise estimated values with the autocorrelation function of the received signal wherein only a section of the autocorrelation function of the received signal is evaluated, the received signal substantially containing the entirety of information about the noise, and wherein prior to determining the noise estimated values from the evaluated section of the autocorrelation function of the received signal, the autocorrelation function of the evaluated section of the autocorrelation function of the received signal is again constituted to determine the noise estimated values on the basis of this re-constituted autocorrelation function; and an adaptive filter receiving the signal and producing a prediction value for the received signal based on the received signal, wherein the adaptive filter has filter coefficients and adaptively adjusts the filter coefficients as a function of a prediction error of the adaptive filter, and the autocorrelation determination device derives the autocorrelation function of the received signal from the filter coefficients of the adaptive filter when the adaptive filter is in a stable state.

* * * * *